United States Patent
Line et al.

(10) Patent No.: US 10,765,220 B2
(45) Date of Patent: Sep. 8, 2020

(54) DRAINAGE CHANNELS IN FOAM PAD SEATING

(71) Applicant: Ford Global Technologies, LLC, Dearborn, MI (US)

(72) Inventors: Johnathan Andrew Line, Northville, MI (US); Spencer Hoernke, Dundas (CA); Marcos Silva Kondrad, Macomb Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 96 days.

(21) Appl. No.: 15/922,354

(22) Filed: Mar. 15, 2018

(65) Prior Publication Data
US 2019/0281989 A1 Sep. 19, 2019

(51) Int. Cl.
*A47C 7/66* (2006.01)
*B32B 5/18* (2006.01)
*B60N 2/58* (2006.01)
*A47C 7/18* (2006.01)
*B60N 2/70* (2006.01)

(52) U.S. Cl.
CPC ............ *A47C 7/66* (2013.01); *A47C 7/18* (2013.01); *B32B 5/18* (2013.01); *B60N 2/5891* (2013.01); *B60N 2/70* (2013.01)

(58) Field of Classification Search
CPC .... A47C 7/66; A47C 7/18; B32B 5/18; B60N 2/589; B60N 2/70
USPC .................................................. 297/452.27
See application file for complete search history.

(56) References Cited

U.S. PATENT DOCUMENTS

| | | | |
|---|---|---|---|
| 3,331,089 A * | 7/1967 | Ornas, Jr. | 297/452.47 |
| 4,087,775 A | 5/1978 | MacKenzie et al. | |
| 5,189,743 A | 3/1993 | Difloe | |
| 6,893,087 B2 | 5/2005 | Hancock et al. | |
| 8,696,067 B2 * | 4/2014 | Galbreath | 297/452.1 |
| 9,346,237 B2 | 5/2016 | Roberts, Jr. | |
| 2015/0107753 A1 | 4/2015 | Lambert et al. | |
| 2015/0118426 A1 | 4/2015 | Roberts | |

FOREIGN PATENT DOCUMENTS

WO 01015892 A1 3/2001

* cited by examiner

*Primary Examiner* — Anthony D Barfield
(74) *Attorney, Agent, or Firm* — David Coppiellie; Price Heneveld LLP

(57) ABSTRACT

A seat cushion assembly that includes a first foam pad defining a plurality of water drainage columns disposed therethrough. A second foam pad is disposed below the first foam pad where the second foam pad and the first foam pad define at least one flow channel in fluid communication with the at least one water drainage column. A topper pad is disposed over the first foam pad and the at least one water drainage column.

20 Claims, 9 Drawing Sheets

DRAINAGE CHANNELS IN FOAM PAD SEATING

FIELD OF THE INVENTION

The present disclosure generally relates to foam pads used in seating, and more particularly, to a molded drainage channel formed in foam padding used in seating applications.

BACKGROUND OF THE INVENTION

Vehicle seating assemblies and the foam used to make them are not typically designed for use in situations where it will be exposed to water. After continued exposure to the elements, i.e., sun, rain, and snow, the materials used to make up the seat covers and cushions can crack, tear, and generally disintegrate. This disintegration is at least partially due to water collecting on the seats and seeping into the cushion. Such wear can be problematic for today's automotive seats because they can house a lot of technology beneath the seat which should not be exposed to water. Many of the current seating assemblies available use foams that act like a sponge where the water soaks into the foam and takes a relatively long time to dry out while also having the potential to damage the sensitive electrical equipment beneath the seat due to the unpredictable drainage of the water in the foam.

The most common solutions used in seats to deal with water are compression molded foam, waterproof trim covers, and spray skin vinyl which are all aimed at preventing water from entering the foam. Such solutions however create new issues as these non-permeable skin layers prevent air flow from reaching users thus creating thermal discomfort. Maintaining the posterior of an occupant in a dry environment creates a more pleasant and comfortable ride.

SUMMARY OF THE INVENTION

According to one aspect of the present invention, a seat cushion assembly is provided. The seat cushion assembly includes a first foam pad defining a plurality of water drainage columns disposed therethrough. The seat cushion assembly further includes a second foam pad disposed below the first foam pad, the second foam pad and the first foam pad defining at least one flow channel in fluid communication with the plurality of water drainage columns and a topper pad disposed over the first foam pad and the plurality of water drainage columns.

Embodiments of the first aspect of the invention can include any one or a combination of the following features:
  the topper pad is substantially porous to water;
  the water drainage column is configured to direct water to the flow channel;
  the second foam pad is configured to have an angled surface to direct water in the at least one flow channel to a drainage hole;
  the first foam pad is chamfered to direct water into the plurality of water drainage columns;
  the plurality of water drainage columns of the first foam pad are positioned in one or more rows;
  the first foam pad defines three rows of one or more water drainage columns;
  the first and second foam pad comprise an open-cell expanded polypropylene (EPP) foam;
  electronic components disposed below the second foam pad;
  attachment features disposed below the second foam pad that are configured to secure the second foam pad to an underlying seating suspension assembly.

According to another aspect of the present invention, a seat cushion assembly is provided. The seat cushion assembly includes a first foam pad defining a plurality of water drainage columns disposed therethrough and a second foam pad disposed below the first foam pad. The first and second foam pads define a flow channel in fluid communication with the drainage columns and a topper pad disposed over the first foam pad.

Embodiments of the second aspect of the invention can include any one or a combination of the following features:
  the first foam pad is chamfered to direct water into the plurality of water drainage columns;
  the second foam pad is configured to have an angled surface to direct water in the flow channel to a drainage hole;
  the topper pad is substantially porous to water;
  the plurality of water drainage columns of the first foam pad are positioned in one or more rows;
  attachment features disposed below the second foam pad that are configured to secure the second foam pad to an underlying seating suspension assembly.

According to yet another aspect of the present invention, a method of making a cushion assembly is provided. The method includes forming a first foam pad, forming a plurality of water drainage columns positioned through the first foam pad, operably coupling a second foam pad with the first foam pad to define a flow channel being in fluid communication with the plurality of water drainage columns, and operably coupling a topper pad over the first foam pad.

Embodiments of the third aspect of the invention can include any one or a combination of the following features:
  foaming an angled surface on the second foam pad to direct water into the flow channel;
  forming a drainage hole in the second foam pad;
  forming the first foam pad to have a chamfered top surface to direct water into the plurality of water drainage columns.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
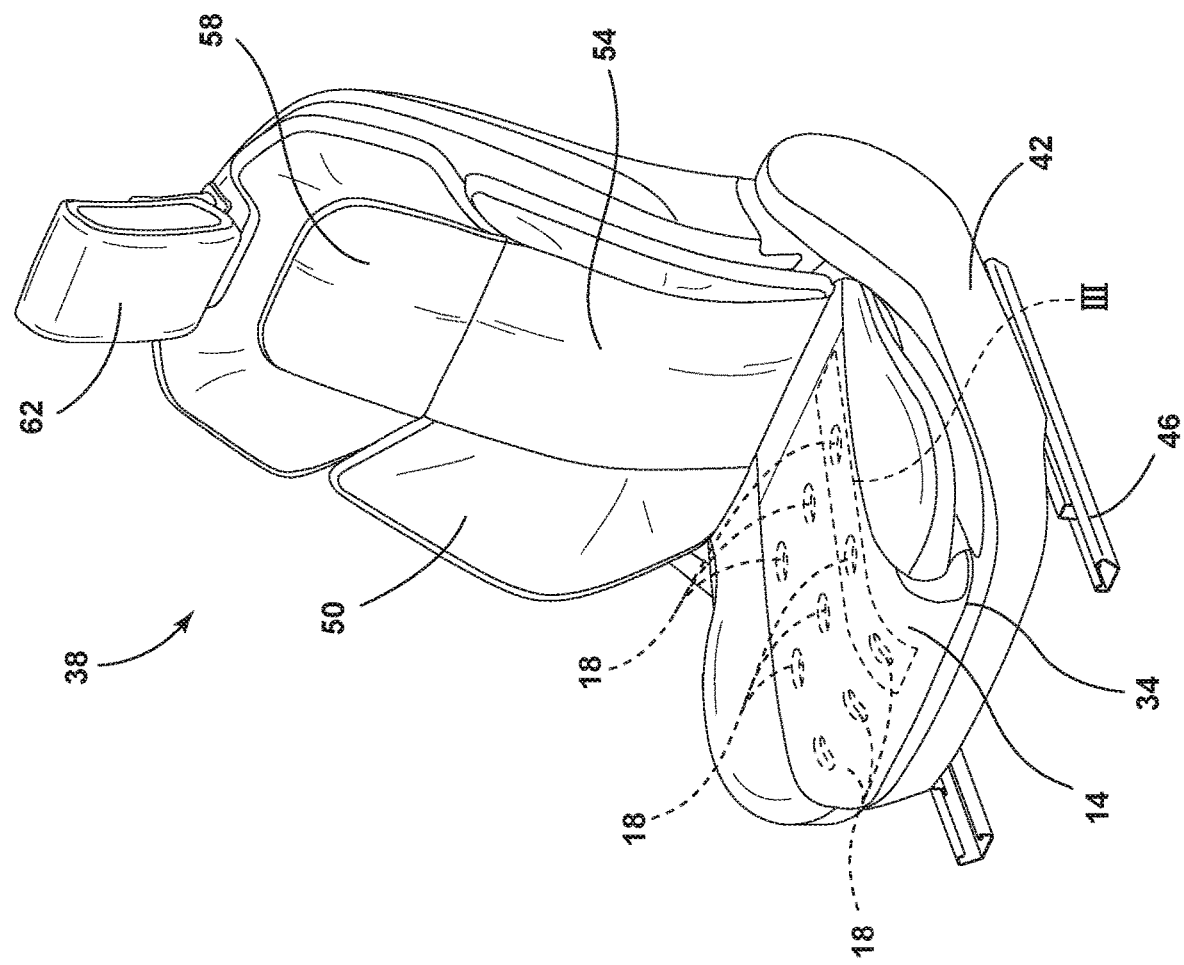
FIG. 1 is a front perspective view of a seating assembly according to some aspects of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-12, reference numeral 10 generally designates a seat cushion assembly. The seat cushion assembly 10 includes a first foam pad 14 defining a plurality of water drainage columns 18 disposed therethrough. A second foam pad 22 is disposed below the first foam pad 14 where the second foam pad 22 and the first foam pad 14 define at least one flow channel 26 in fluid communication with the at least one water drainage column 18. A topper pad 30 is disposed over the first foam pad 14 and the at least one water drainage column 18.

Traditional expanded polypropylene (EPP) pads used for cushion assemblies are difficult to keep dry within seating assemblies. Adding drainage holes for both ventilation and drying in an EPP pad can result in failures of these cushion assemblies. These failures typically result from point loading or abuse loading that results in high tensile stresses that occur at the bottom of an EPP pad or the cushion assembly. As a result, an improved construction that can better manage point loading and/or abuse loading while additionally providing effective drainage holes would prove beneficial. In some aspects, the first and second foam pad 14, 22 include an open-cell expanded polypropylene (EPP) foam.

With reference now to FIG. 1, the seat cushion assembly 10 is disposed in a seat 34 of a seating assembly 38 and may be used in any vehicle, such as a car, a truck, a van, etc. It is also contemplated that the concepts set forth in this disclosure may be utilized in a front or forward position of the vehicle as well as a rear or rearward position of the vehicle. The seat cushion assembly 10, as illustrated, includes a seat base 42 that is positioned on rail slides 46 to allow fore and aft movement of the seat cushion assembly 10 relative to the vehicle. The seat 34 is operably coupled with the seat base 42 and is movable relative thereto, as set forth in further detail below. In addition, a seatback 50 of the seating assembly 38 includes a lower lumbar region 54 and an upper thoracic region 58 as well as a head restraint 62. Each of the components of the seatback 50 may be configured for adjustability to properly support the weight of different sized occupants inside the vehicle.

Figure 2:
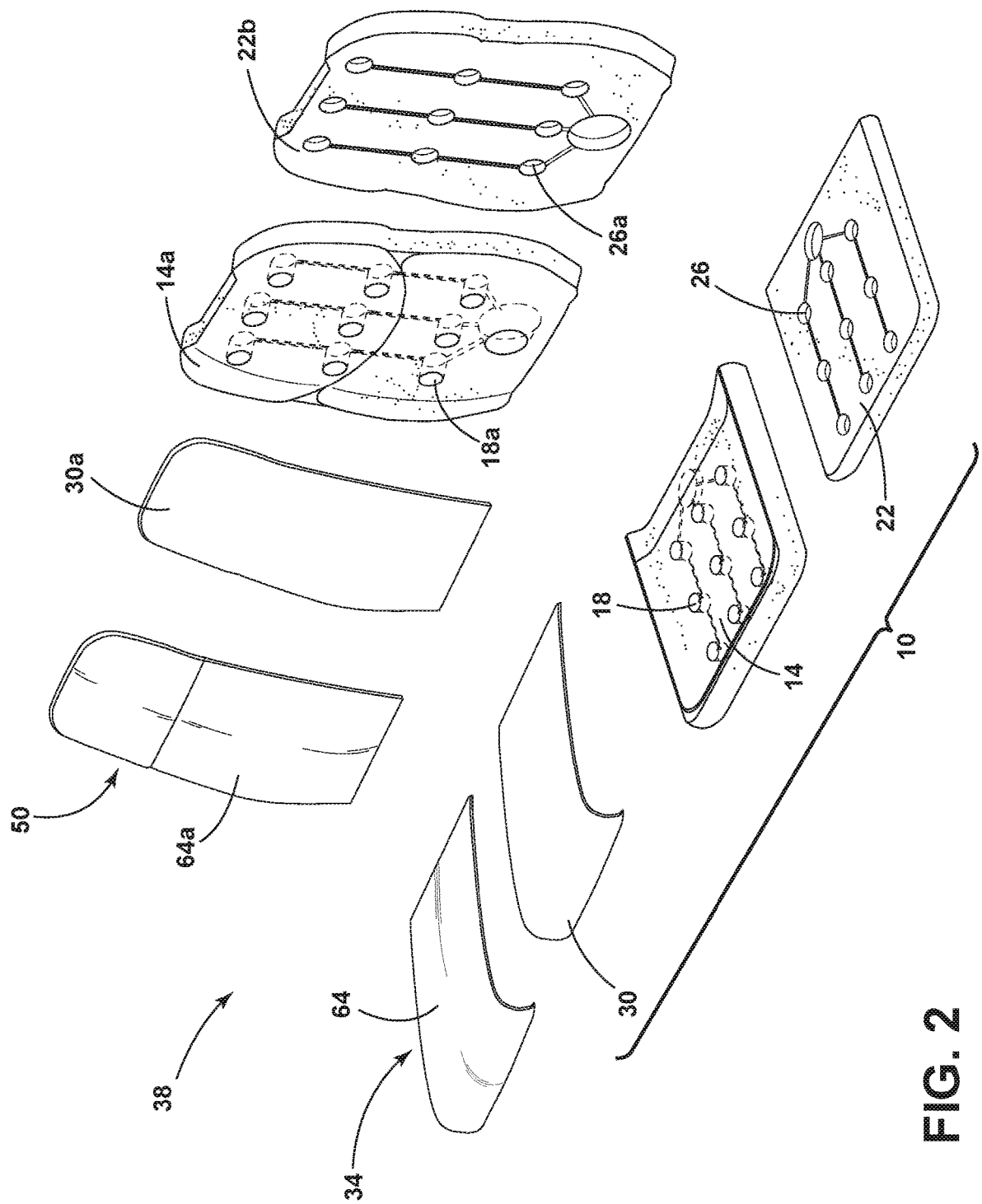
FIG. 2 is an exploded side perspective view of a seat cushion assembly in a vehicle seat according to some aspects of the current disclosure.

Referring now to FIG. 2, the seat 34 of the seating assembly 38 is provided having a seat trim 64 covering the respective layers of the seat cushion assembly 10. In some aspects, the seat trim 64 may include a variety of different water permeable materials including, for example, leather, vinyl, fabrics, and other synthetic materials. The seat cushion assembly 10 includes the topper pad 30 positioned on top of the first foam pad 14 where the first foam pad 14 is additionally positioned on top of the second foam pad 22. The first foam pad 14 includes one or more water drainage columns 18 where the combined first and second foam pads 14, 22 form one or more flow channels 26 that can be used to direct water. When the description herein refers to "water", the term "water" is meant to include any fluid that may come into contact with the seating assembly 38 and/or seat cushion assembly 10. For example, the term "water" may include fluids including milk, rain, juice, coffee, urine, sweat, and/or gases.

Still referring to FIG. 2, the seatback 42 of the seating assembly 38 is provided having a seat trim 64a covering a respective seatback topper pad 30a, a seatback first foam pad 14a, and a seatback second foam pad 22a. The seatback first foam pad 14a may include one or more water drainage columns 18a where the combined seatback first and second foam pads 14a, 22a are positioned together and may form one or more flow channels 26a that can be used to direct water. In some aspects, the seatback 42 may not include water drainage features such as the one or more water drainage columns 18a and/or one or more flow channels 26a. In other aspects, both the seat 34 and the seatback 42 may include the water drainage features described herein including the one or more water drainage columns 18, 18a and/or one or more flow channels 26, 26a, respectively. It is understood that the descriptions outlining and teaching the drainage features for the seat cushion assembly 10, which can be used in any combination, apply equally well to the seatback 42. Depending on the application or desired use of the seating assembly 38, either one or both of the seat 34 and seatback 42 may include the one or more water drainage columns 18, 18a and/or one or more flow channels 26, 26a, respectively, as disclosed herein.

Figure 3:
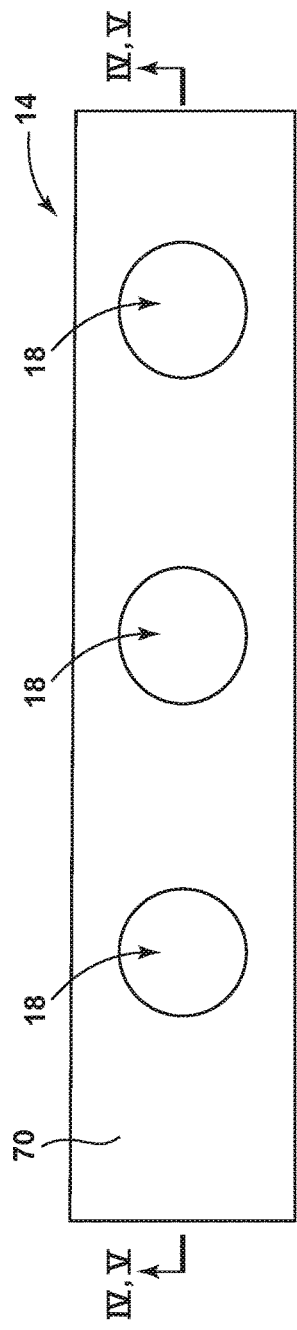
FIG. 3 is a front elevational view of a first foam pad of the seat cushion assembly of FIG. 1 taken at area II according to some aspects of the current disclosure.
Figure 4:
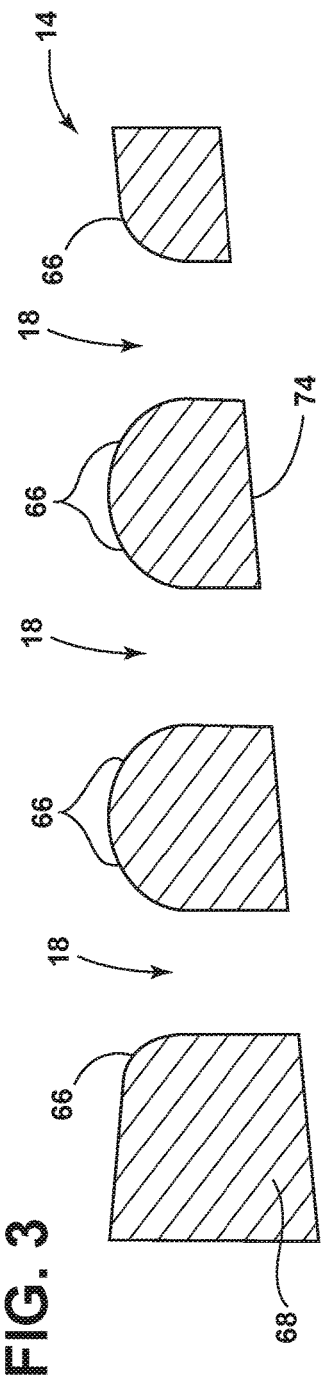
FIG. 4 is a cross-sectional view of the first foam pad of the seat cushion assembly of FIG. 3 taken along the line III-III according to some aspects of the current disclosure.
Figure 5:
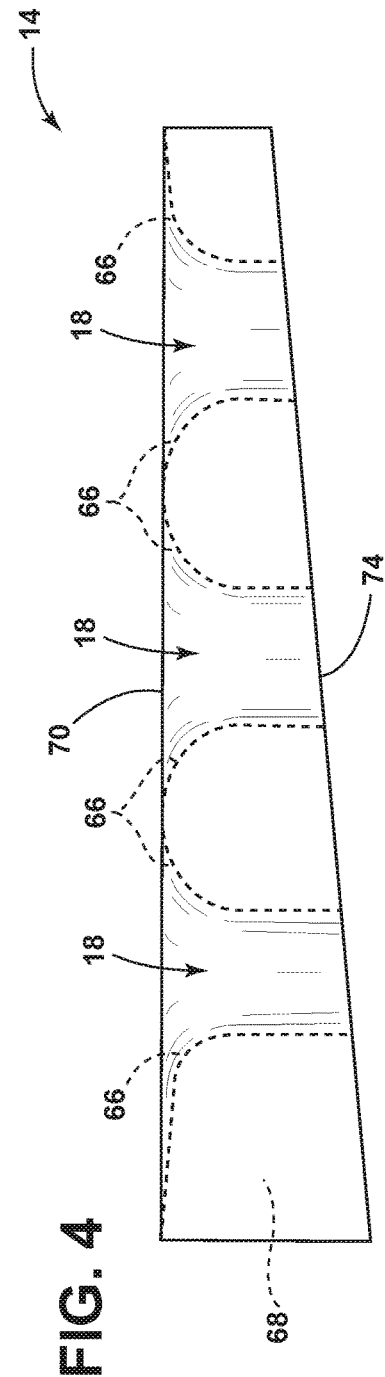
FIG. 5 is a cross-sectional view of the first foam pad of the seat cushion assembly of FIG. 3 taken along the line IV-IV according to some aspects of the current disclosure.

With reference now to FIGS. 3-5, one aspect of the seat cushion assembly 10 is illustrated as taken from area II of FIG. 1. Specifically, the first or upper foam pad 14 is illustrated. The first/upper foam pad 14 is configured to provide support to the buttocks of an occupant, and is also configured to provide drainage for any water spilled or applied to the seat 34. Three water drainage columns 18 are illustrated in area II. However, it will be understood that any number of drainage columns 18 may be present through the upper foam pad 14. As shown in FIGS. 4 and 5, the water drainage columns 18 are open at a top portion thereof and include a chamfered surface 66 that aids in the drainage of water through the water drainage columns 18. In some aspects, the first foam pad 14 is chamfered to direct water into the water drainage column 18. A first foam pad body 68 makes up the solid portions of the first foam pad 14 and can be used to provide the structural support of the seat 34 and form the other desired features in the cushioning including the water drainage columns 18. A top portion 70 of the first foam pad 14 includes one or more chamfered surfaces 66 that direct water to the water drainage columns 18 while a bottom portion 74 may include one or more top pad grooves 90 (see FIG. 10) used in combination with the bottom pad groves 94 (see FIG. 11) to form the flow channels 26. In some aspects, the water drainage column 18 is configured to direct water to the flow channel 26. The water drainage columns 18 of the first foam pad 14 that, together with the top and bottom grooves, 90, 94 of the first and second foam pads 14, 22, respectively, define the flow channels 26. It will be understood that the first foam pad 14 may take on a variety of shapes, materials, and constructions where the illustrated construction is exemplary. Although the shape of the water drainage columns 18 are provided have a cylindrical shape, the pass-through features may have any number of different shapes not meant to be limiting.

Figure 6:
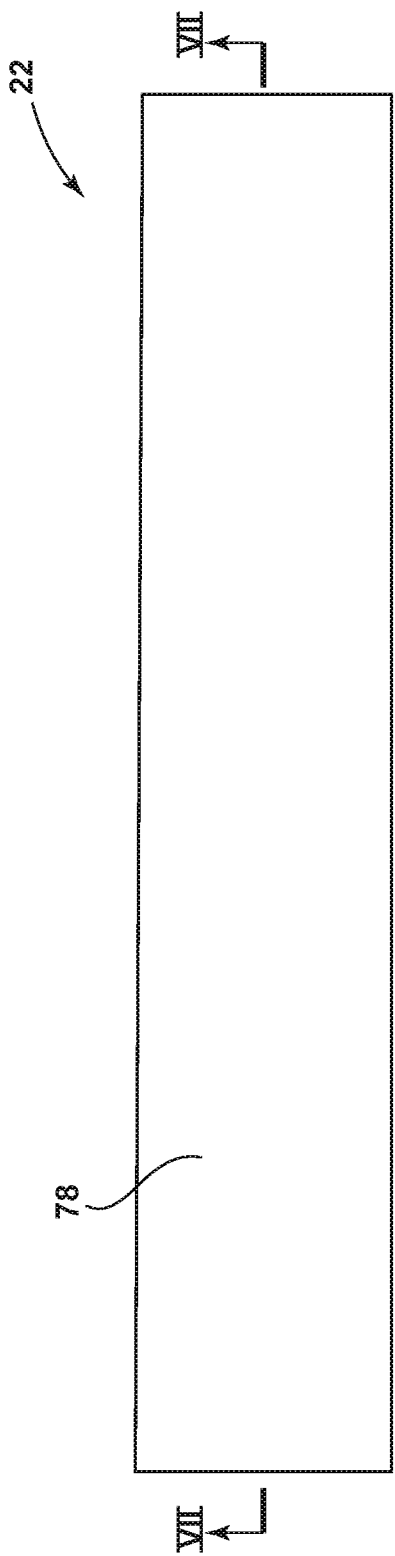
FIG. 6 is a front elevational view of a second foam pad of the seat cushion assembly of FIG. 2 taken at area II according to some aspects of the current disclosure.
Figure 7:
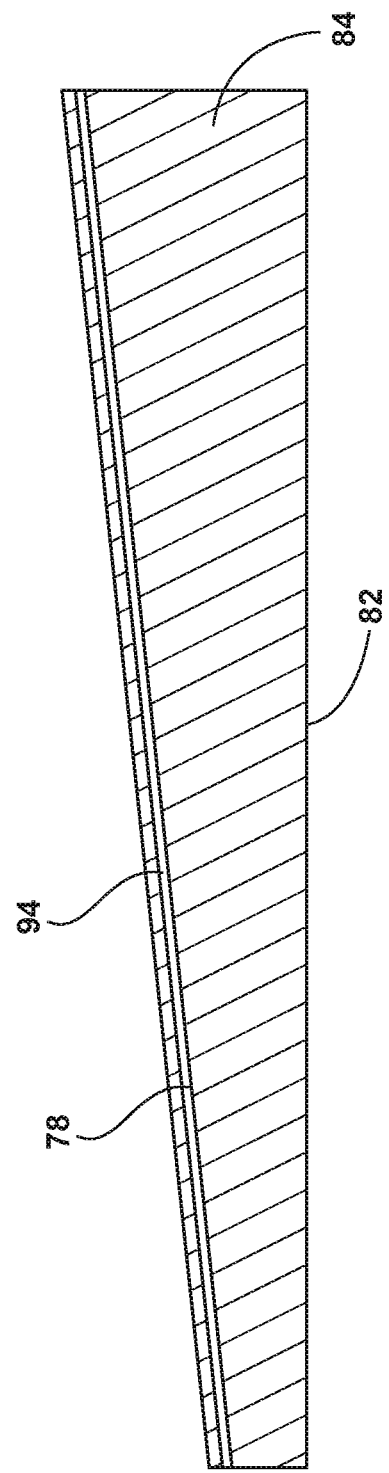
FIG. 7 is a cross-sectional view of the second foam pad of the seat cushion assembly of FIG. 6 taken along the line VI-VI according to some aspects of the current disclosure.

With reference now to FIGS. 6 and 7, a top view and a side view of the second or lower foam pad 22 is illustrated, respectively. The second foam pad 22 includes a top angled portion 78 and one or more bottom pad grooves 90 used to direct water through the flow channels 26 using gravity. As with the first foam pad 14, the second foam pad 22 may take on a variety of shapes, materials, and constructions and is not limited to the construction as set forth in FIGS. 6 and 7. A second foam pad body 84 makes up the solid portions of the second foam pad 22 and can be used to help provide the structural support of the seat 34 and form other desired features in the cushioning including the flow channels 26. In some aspects, as an alternative to or in combination with gravity being used to direct water through the water drainage columns 18 (see FIG. 1) and flow channels 26, suction may be provided using a vacuum, aspirator, or other device known in the art used to apply a vacuum to the drainage system including the water drainage columns 18, flow channels 26, and drainage hole 98 (see FIG. 9).

Figure 8A:
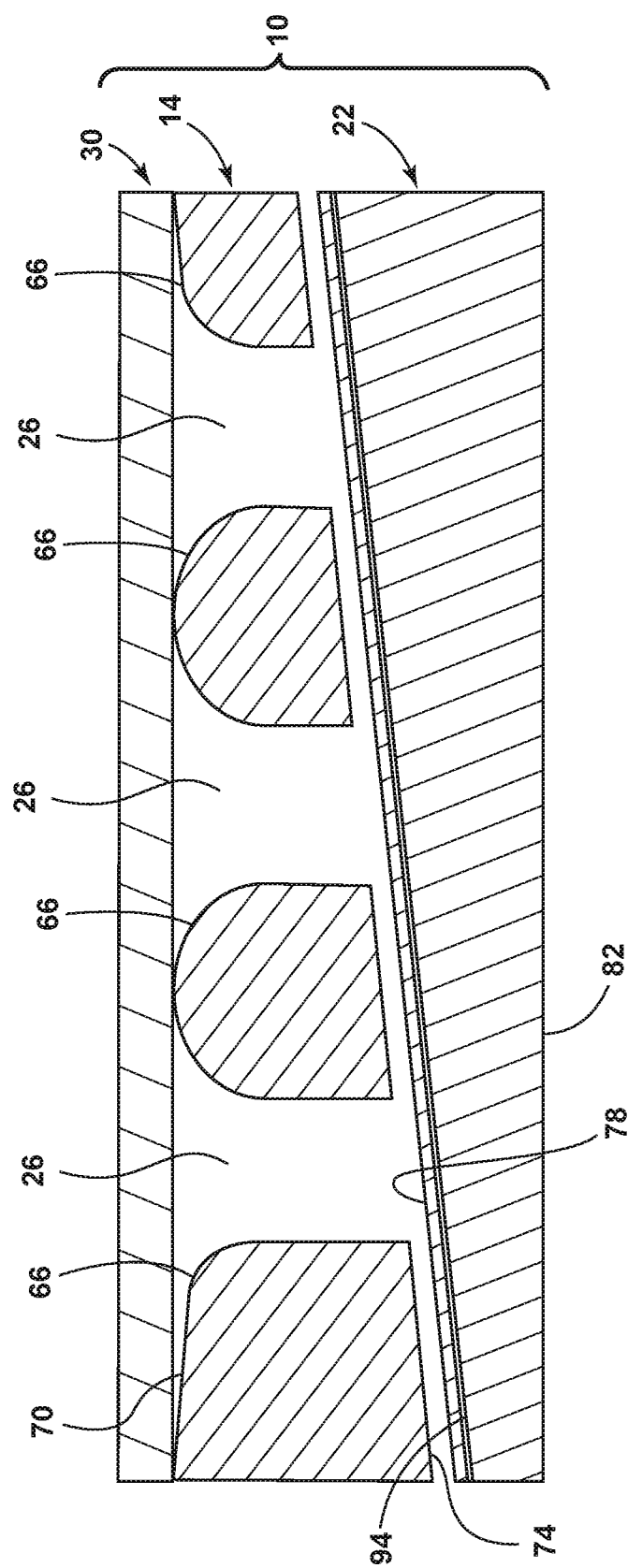
FIG. 8A is a front elevational cross-sectional view of a seat cushion assembly according to some aspects of the current disclosure.

With reference now to FIG. 8A, the seat cushion assembly 10 is shown to include the topper pad 30, the first foam pad 14, and the second foam pad 22. The topper pad 30 is generally a foam material, e.g. EPP, that is porous so water and/or air can pass directly through the topper pad 30. In some aspects, the topper pad 30 is substantially porous to water. The topper pad 30 is positioned directly on top of the first foam pad 14 so the topper pad 30 is in direct contact with the top portion 70 of the first foam pad 14. The first foam pad 14 is positioned directly on top of the second foam pad 22 so the bottom portion 74 of the first foam pad 14 is in direct contact with the top angled portion 78 of the second foam pad 22. Upon layering the topper pad 30, first foam pad 14, and second foam pad 22 of the seat cushion assembly 10, the plurality of water drainage columns 18 and the corresponding top pad grooves 90 (see FIG. 10) may be positioned and aligned with the bottom pad grooves 94 to form the plurality of flow channels 26. In some aspects, there may be two flow channels 26, three flow channels 26, four flow channels 26, or greater than four flow channels 26. In some aspects, the seat cushion assembly 10 may include three flow channels 26 spaced parallel along the length of the seat 34 accordingly so a user's thighs or upper legs may be generally positioned and supported by the first and second foam pad bodies 68, 84 located between the respective flow channels 26.

Figure 8B:
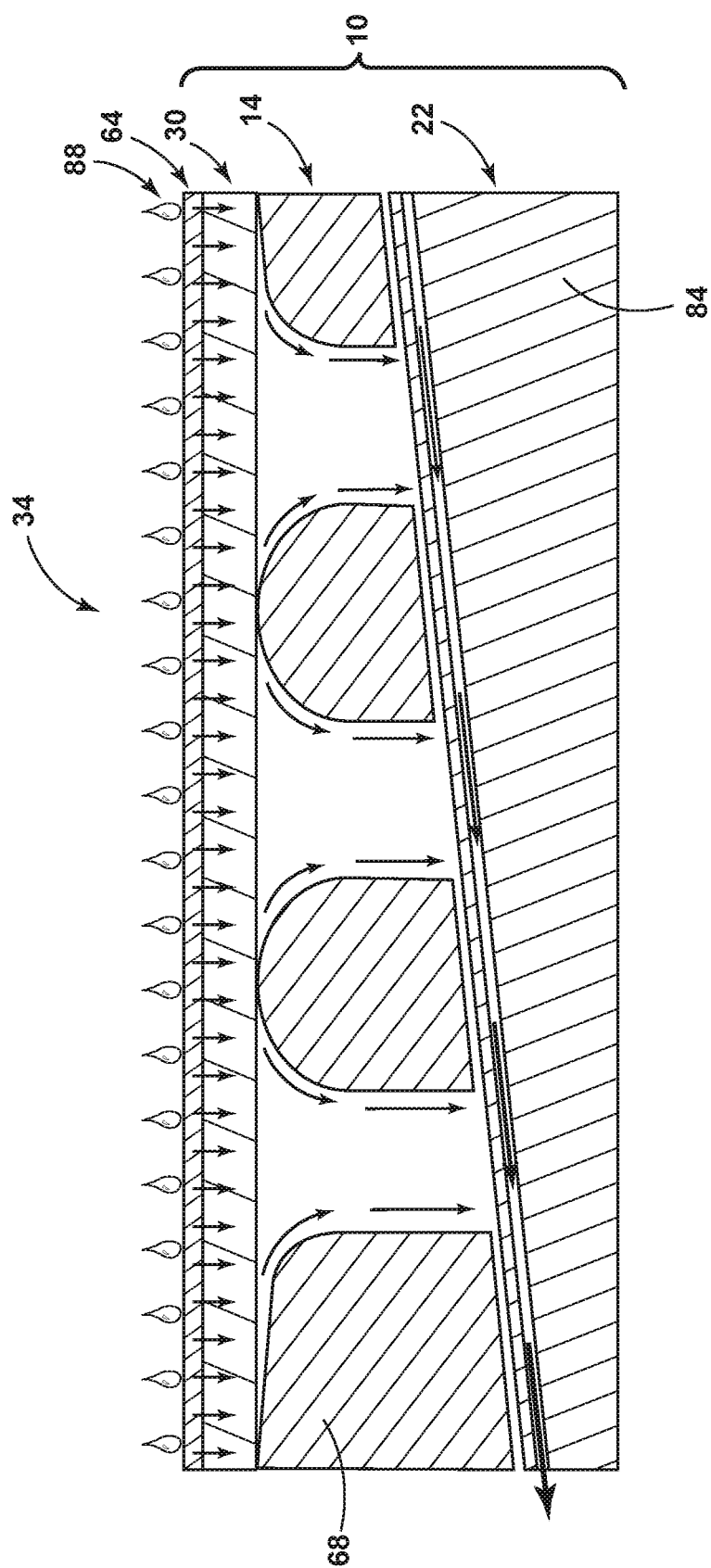
FIG. 8B is a front elevational cross-sectional view of the seat cushion assembly of the present disclosure presented in FIG. 8A representing the flow of water through the seat cushion assembly according to some aspects of the current disclosure.

With reference now to FIG. 8B, the seat cushion assembly 10 is illustrated with water flowing through the seat trim 64, the topper pad 30, the first foam pad 14, and the second foam pad 22. The arrows illustrate the flow of water 88 through the porous seat trim 64 and topper pad 30 where the water then comes in contact with the chamfered surface 66 of the top portion 70 of the first foam pad 14. As the water flows down the chamfered surface 66, the water is then directed towards the one or more water drainage columns 18. As the water is directed to and down through the water drainage columns 18 via gravity, the water will trickle down to the flow channel 26 where the water will again be directed down along the top angled portion 78 of the second foam pad 22. The water will finally reach the one or more drainage holes 98 (see FIG. 9) where the water can be eliminated from the seat cushion assembly 10 of the seating assemble 38.

The chamfered surfaces 66 of the top portion 70 of the first foam pad 14 may have a variety of different designs used to direct the water to the water drainage columns 18. The chamfered surfaces 66 of FIGS. 4-5 and 8A-8B are illustrated having rounded portions of the first foam pad body 68. In some aspects, the chamfered surface 66 may be rounded, slanted, and/or angled at a variety of different pitches, angles, and/or shapes.

Figure 10:
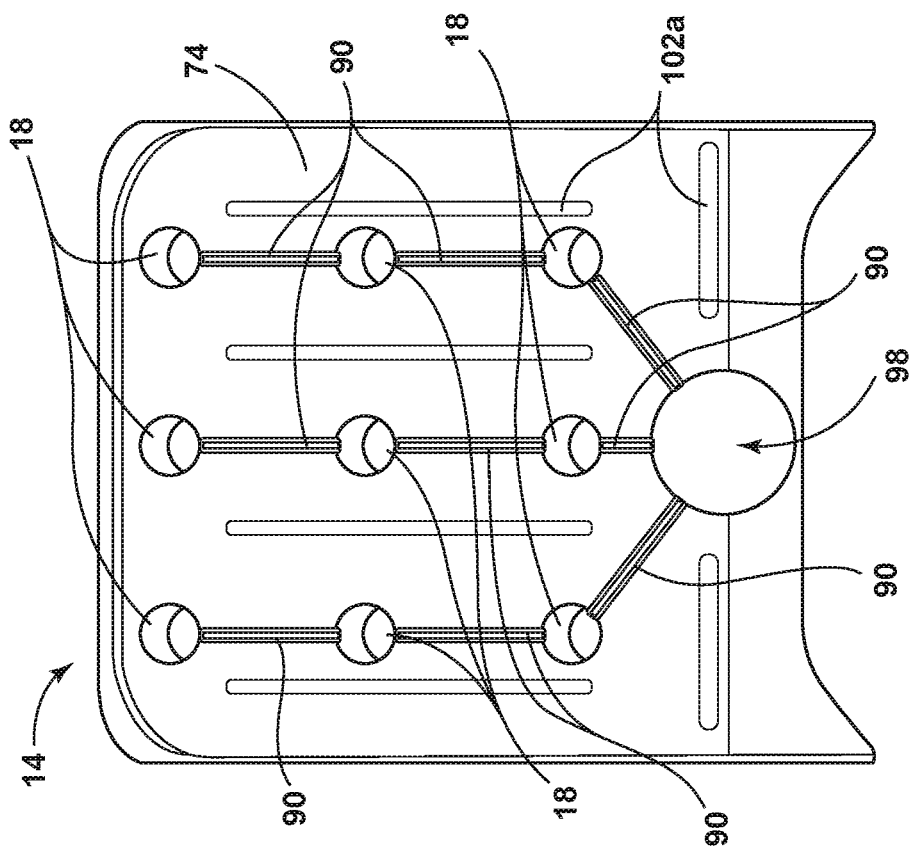
FIG. 10 is a bottom view of the upper foam pad of the seat cushion assembly of FIG. 2 according to some aspects of the current disclosure.
Figure 9:
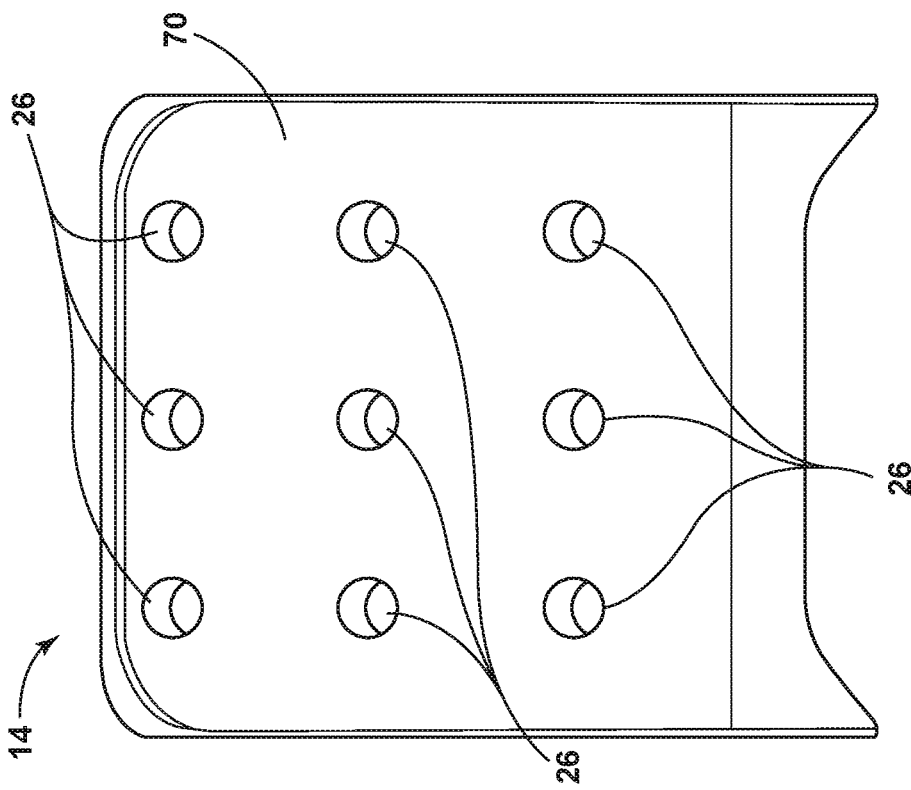
FIG. 9 is a top view of an upper foam pad of the seat cushion assembly of FIG. 2 having a plurality of water drainage columns according to some aspects of the current disclosure.

With reference now to FIGS. 9 and 10, one example of the upper foam pad 14 is illustrated in its respective top and bottom views. The upper foam pad 14, as shown in FIG. 9, illustrates the plurality of water drainage columns 18. In some aspects, the number of water drainage columns 18 may be 3, 4, 5, 6, 7, 8, 9, 10, 11, 12, 13, 14, 15, or more depending on the required drainage and support required by the seat 34 and/or seatback 50 of the seating assembly 38. The flow channels 29 may be aligned in rows where the number of rows may be used to form two flow channels 26, three flow channels 26, four flow channels 26, or greater than four flow channels 26. In some aspects, the water drainage columns 18 of the first foam pad 14 are positioned in one or more rows. In still other aspects, the first foam pad 14 defines three rows of one or more water drainage columns 18. In addition, the bottom side 74 of the upper foam pad 14 includes the exit portions of the plurality of water drainage columns 18 in fluid connection via the top pad grooves 90 the flow channels 26. The one or more flow channels 26 are coupled to a main drainage hole 98. In some aspects, positioning features 102a may be formed in the bottom portion 74 of the first foam pad 14 to either help position and or lock the first foam pad 14 to the second foam pad 22.

Figure 12:
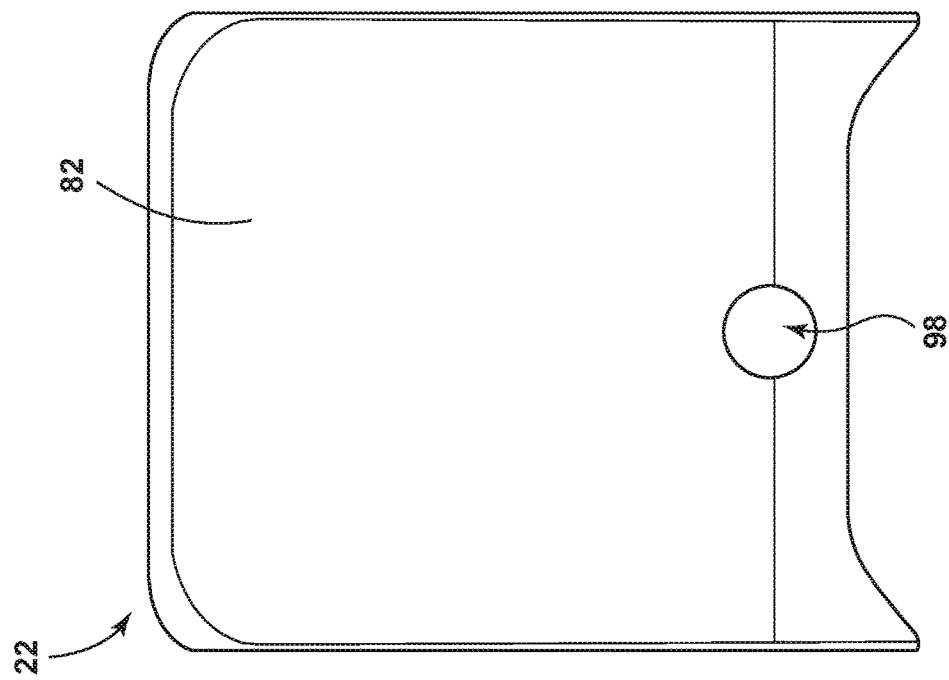
FIG. 12 is a bottom view of the second foam pad of the seat cushion assembly of FIG. 2 according to some aspects of the current disclosure.
Figure 11:
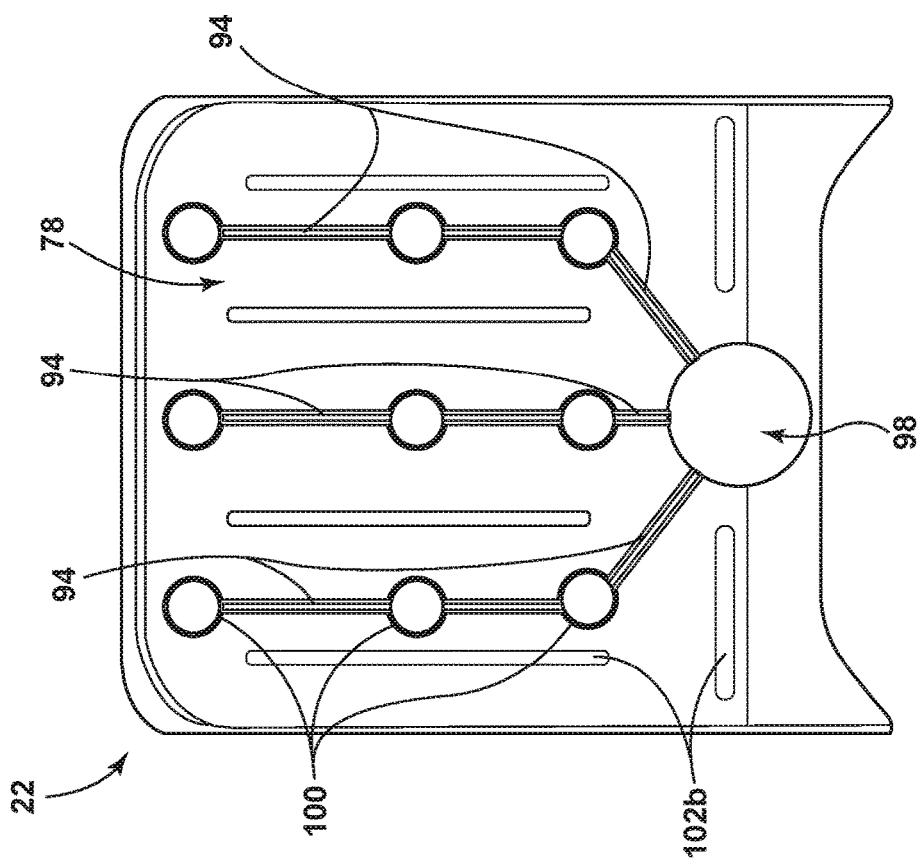
FIG. 11 is a top view of a second foam pad of a seat cushion assembly of FIG. 2 according to some aspects of the current disclosure.

With reference now to FIGS. 11 and 12, the second foam pad 22 is illustrated in its respective top and bottom views. The second foam pad 22 is similar in construction to the first foam pad 14, but lacks the water drainage columns 18 positioned through the first foam pad 14 between the topper pad 30 and second foam pad 22. The bottom pad grooves 94 run along and are positioned in the top angled portion 78 of the second foam pad 22 towards the drainage hole 94 via the one or more flow channels 26. In some aspects, column grooves 100 may be formed into the bottom pad grooves 94 to better direct water received from the water drainage columns 18 out through the flow channels 26. In other aspects, positioning features 102b may be formed in the top angled portion 78 of the second foam pad 22 to either help position and or lock the first foam pad 14 to the second foam pad 22. In some aspects, the positioning features 102a, 102b may include tongue and groove features, splice features, or other connecting features known in the art. Attachment features (not shown) may additionally be disposed along the bottom portion 82 of the second foam pad 22 and can additionally be configured to secure the second foam pad 22 to the underlying seating suspension assembly and/or electronic components. In some aspects, electronic components may be disposed below the second foam pad 22. In other aspects, attachment features may be disposed below the second foam pad 22 that are configured to secure the second foam pad 22 to an underlying seating suspension assembly.

Figure 13:
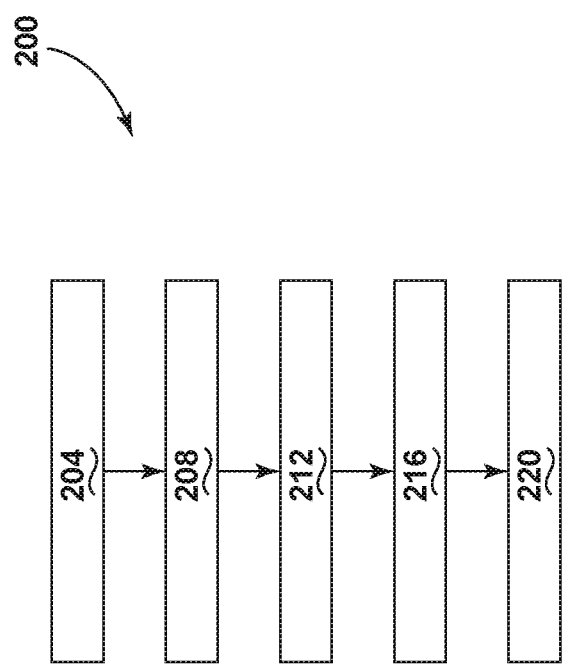
FIG. 13 is a flow diagram of a method of making a cushion assembly according to some aspects of the present disclosure.

Referring now to FIG. 13, with continued reference to FIGS. 1-12, a method 200 for making the seat cushion assembly 10 is shown. The method 200 may begin with a step 204 that includes forming the first foam pad 14. The first foam pad 14 may be cast, molded, compression molded, cut and/or formed from any other known technique in the art from EPP foam or any other polymeric material known or appreciated by one skilled in the art.

Next is a step 208 of forming the plurality of water drainage columns 18 through the first foam pad 14. In some aspects, the water drainage columns 18 may be cut or formed in the first foam pad 14 after the first foam pad 14 is fabricated and in other aspects, the water drainage columns 18 may be formed as the first foam pad 14 is fabricated. The exit portions of the water drainage columns 18 located at the top portion 70 of the first foam pad 14 may be designed to provide the chamfered surface 66 to help direct the water to each of the water drainage columns 18. The exit portions of the water drainage columns 18 located at the bottom portion 74 of the first foam pad 14 may be coupled to top pad groves 90 to help form the flow channels 26.

Next is a step 212 of operably coupling the second foam pad 22 with the first foam pad 14 to define the flow channels 26 that are in fluid communication with the plurality of water drainage columns 18. The top pad grooves 90 of the first foam pad 14 and the bottom pad grooves 94 of the second foam pad 22 together form the flow channels 26 when the first and second foam pads 14, 22 and sandwiched together.

Next is a step 216 of operably coupling the topper pad 30 over the first foam pad 14. The topper pad 30 is positioned to be in direct contact with the top portion 70 of the first foam pad 14 where the first foam pad 14 is sandwiched between the topper pad 30 and the second foam pad 22 to form the seat cushion assembly 10.

Next is a step 220 of forming the angled surface 78 on the second foam pad 22 to direct water into the flow channel 26. In some aspects, the angled surface 78 may be formed to have a 1° angle, a 2° angle, a 3° angle, a 4° angle, a 5° angle, a 6° angle, a 7° angle, a 8° angle, a 9° angle, a 10° angle, a 11° angle, a 12° angle, a 13° angle, a 14° angle, a 15° angle, or great than 15° angle with respect to the bottom portion 82 of the second foam pad 22.

It is understood that the descriptions outlining and teaching the seat cushion assembly 10 previously discussed, which can be used in any combination, apply equally well to the method 200 for making the cushion assembly 10.

A variety of advantages may be derived from the use of the present disclosure. The occupant or user is able to maintain a dry environment upon sweating or spilling water on the seat 34 of the seating assembly 38 since any fluids are able to quickly pass through the seat trim 64 and topper pad 30 to be directed to the one or more flow channels 26 through the one or more water drainage columns 18. The disclosed seating assembly 38 provides an economical, easily moldable seat cushion assembly 10 that provides flow channels 26 used to quickly and efficiently direct exposed fluids to the drainage hole 98. The design of the seat cushion assembly 10 permits may include a number of different combinations of water drainage columns 18 and flow channels 26 to both remove water from the seat cushion assembly 10 and support the occupant.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A seat cushion assembly comprising:
a first foam pad defining a plurality of water drainage columns disposed therethrough and defining top pad grooves disposed on a bottom portion of the first foam pad;
a second foam pad disposed below the first foam pad and defining bottom pad grooves disposed on a top angled portion of the second foam pad, the second foam pad and the first foam pad defining at least one flow channel in fluid communication with the plurality of water drainage columns; and
a topper pad disposed over the first foam pad, the top pad grooves, and the plurality of water drainage columns.

2. The seat cushion assembly of claim 1, wherein the topper pad is substantially porous to water.

3. The seat cushion assembly of claim 1, wherein the water drainage column is configured to direct water to the flow channel.

4. The seat cushion assembly of claim 1, wherein the second foam pad is configured to have an angled surface to direct water in the at least one flow channel to a drainage hole.

5. The seat cushion assembly of claim 1, wherein the first foam pad is chamfered to direct water into the plurality of water drainage columns.

6. The seat cushion assembly of claim 1, wherein the plurality of water drainage columns of the first foam pad are positioned in one or more rows.

7. The seat cushion assembly of claim 1, wherein the first foam pad defines three rows of one or more water drainage columns.

8. The seat cushion assembly of claim 1, wherein the first and second foam pad comprise an open-cell expanded polypropylene (EPP) foam.

9. The seat cushion assembly of claim 1, further comprising:
electronic components disposed below the second foam pad.

10. The seat cushion assembly of claim 1, further comprising:
attachment features disposed below the second foam pad that are configured to secure the second foam pad to an underlying seating suspension assembly.

11. A seat cushion assembly comprising:
a first foam pad defining top pad grooves thereon and defining a plurality of water drainage columns disposed therethrough;
a second foam pad disposed below the first foam pad and defining bottom pad grooves on a top angled surface of the second foam pad, wherein the first and second foam pads define a flow channel in fluid communication with the drainage columns; and
a topper pad disposed over the first foam pad.

12. The seat cushion assembly of claim 11, wherein the first foam pad is chamfered to direct water into the plurality of water drainage columns.

13. The seat cushion assembly of claim 11, wherein the second foam pad is configured to have an angled surface to direct water in the flow channel to a drainage hole.

14. The seat cushion assembly of claim 11, wherein the topper pad is substantially porous to water.

15. The seat cushion assembly of claim 11, wherein the plurality of water drainage columns of the first foam pad are positioned in one or more rows.

16. The seat cushion assembly of claim 11, further comprising:
attachment features disposed below the second foam pad that are configured to secure the second foam pad to an underlying seating suspension assembly.

17. A method of making a cushion assembly, the method comprising:
forming a first foam pad;
forming a plurality of water drainage columns positioned through the first foam pad;
operably coupling a second foam pad with the first foam pad to define a flow channel being in fluid communication with the plurality of water drainage columns; and
operably coupling a topper pad over the first foam pad.

18. The method of claim 17, further comprising:
forming an angled surface on the second foam pad to direct water into the flow channel.

19. The method of claim 17, further comprising:
forming a drainage hole in the second foam pad.

20. The method of claim 17, further comprising:
forming the first foam pad to have a chamfered top surface to direct water into the plurality of water drainage columns.

* * * * *